(12) United States Patent
Soja et al.

(10) Patent No.: US 8,380,918 B2
(45) Date of Patent: Feb. 19, 2013

(54) NON-VOLATILE STORAGE ALTERATION TRACKING

(75) Inventors: Richard Soja, Austin, TX (US); James B. Eifert, Austin, TX (US); Timothy J. Strauss, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 348 days.

(21) Appl. No.: 12/683,549

(22) Filed: Jan. 7, 2010

(65) Prior Publication Data

US 2011/0167198 A1   Jul. 7, 2011

(51) Int. Cl.
*G06F 13/00*   (2006.01)

(52) U.S. Cl. ................. 711/103; 711/E12.091

(58) Field of Classification Search ............ 711/103
See application file for complete search history.

(56) References Cited

U.S. PATENT DOCUMENTS

| | | |
|---|---|---|
| 6,470,449 B1 | 10/2002 | Blandford |
| 7,270,269 B2 | 9/2007 | Iyer et al. |
| 7,543,144 B2 | 6/2009 | Rensin et al. |
| 2004/0205314 A1* | 10/2004 | Babudri et al. ............... 711/163 |
| 2006/0277353 A1* | 12/2006 | Mizuno et al. ................. 711/4 |
| 2008/0310622 A1* | 12/2008 | Drehmel et al. ............... 380/29 |
| 2009/0157948 A1* | 6/2009 | Trichina et al. ............... 711/103 |
| 2010/0017558 A1* | 1/2010 | Fruin et al. .................... 711/103 |
| 2011/0107010 A1* | 5/2011 | Strauss et al. ................. 711/103 |

OTHER PUBLICATIONS

Dietrich, K. et al.; "Secure Boot Revisited"; The 9th International Conference for Young Scientists; 2008; pp. 2360-2365; IEEE Computer Society.

* cited by examiner

*Primary Examiner* — Edward Dudek, Jr.
*Assistant Examiner* — Sean D Rossiter
(74) *Attorney, Agent, or Firm* — Ranjeev Singh; Joanna G. Chiu

(57) ABSTRACT

A method for tracking alteration of a non-volatile storage includes receiving a request to modify a tracked region of the non-volatile storage. In response to the request, it is determined whether or not a modification of data stored in a non-erasable one-time programmable (NEOTP) alteration log region has occurred. In response to determining that the modification of the data stored in the NEOTP alteration log region has occurred, the tracked region of non-volatile storage is modified in response to the request. In response to determining that the modification of the data stored in the NEOTP alteration log region has not occurred, the request to modify the tracked region of the non-volatile memory is denied.

17 Claims, 3 Drawing Sheets

NON-VOLATILE STORAGE ALTERATION TRACKING

BACKGROUND

1. Field

This disclosure relates generally to non-volatile storage, and more particularly to alteration tracking for non-volatile storage.

2. Related Art

Many applications relating to storage of information involve use of non-volatile storage. By way of example, such applications include storing configuration information, such as operational parameters, storing security and access related information, or other types of information that must be stored in the non-volatile storage. Unauthorized modification of such information can result in adverse consequences. For example, if the configuration information stored in the non-volatile storage corresponds to configuration information for operating an automobile, then unauthorized modification of such information can result in several problems. By way of example, if the information relating to an electronic control unit of an automobile is modified without authority from the manufacturer, the automobile could get damaged. Additionally, by way of example, if the information relating to security and access of an electronic device is modified without authority, then the contents stored in the electronic device could be accessed without the authority to do so.

Accordingly, there is a need for alteration tracking of information stored in a non-volatile storage.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
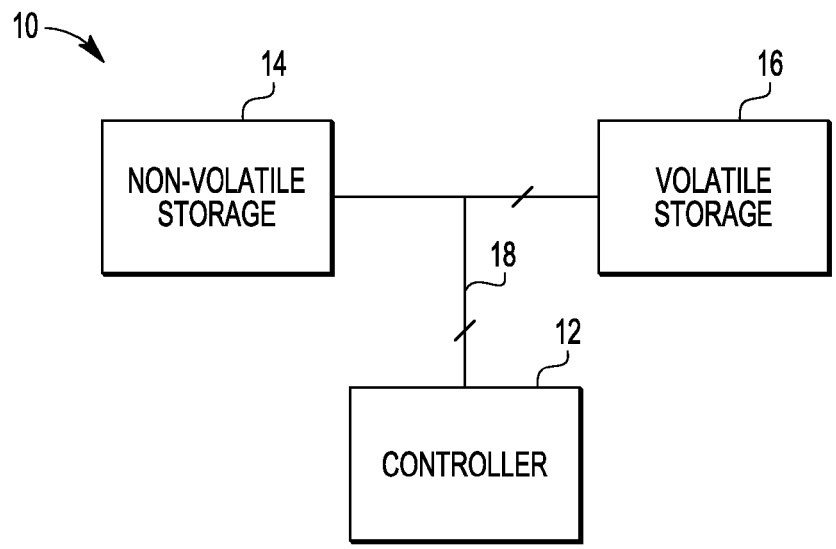
FIG. 1 is a diagram of an electronic device having a non-volatile storage for storing information.

In one aspect, a hardware mechanism is provided to prevent erasure of selected blocks of a non-volatile memory, such as a flash memory, until a permanent record of the attempted erasure is stored. In particular, in one aspect, a method for tracking alteration of a non-volatile storage is provided. The method may include receiving a request to modify a tracked region of the non-volatile storage. The method may further include, in response to the request, determining whether or not a modification of the data stored in a non-erasable one-time programmable (NEOTP) alteration log region has occurred. The method may further include, in response to determining that the modification of the data stored in the NEOTP alteration log region has occurred, modifying the tracked region of the non-volatile storage in response to the request. The method may further include, in response to determining that the modification of the data stored in the NEOTP alteration log region has not occurred, denying the request to modify the tracked region of the non-volatile memory.

In another aspect, a method for tracking alteration of a non-volatile storage is provided. The method may include receiving a first request to modify data stored in a non-erasable one-time programmable (NEOTP) alteration log region of the non-volatile storage. The method may further include in response to the first request, initiating the modification of the data stored in the NEOTP alteration log region. The method may further include receiving a second request to erase at least a portion of a tracked region of the non-volatile storage. The method may further include, in response to the second request, determining whether or not the modification of the data stored in the NEOTP alteration log region has been completed. The method may further include, in response to determining that the modification of the data stored in the NEOTP alteration log region has been completed, erasing the at least a portion of the tracked region of the non-volatile storage in response to the request. The method may further include, in response to determining that the modification of the data stored in the NEOTP alteration log region has not been completed, denying the request to erase the at least a portion of the tracked region of the non-volatile memory.

In still another aspect, a method for tracking alteration of a non-volatile storage is provided. The method may include receiving a request to modify a region of the non-volatile storage. The method may further include, in response to the region being a tracked region of the non-volatile storage, programming an entry of a non-erasable one-time programmable (NEOTP) alteration log region and modifying the tracked region of the non-volatile storage in response to the request. The method may further include, in response to the region being a non-tracked region of the non-volatile storage, modifying the non-tracked region of the non-volatile storage without modifying data stored in the NEOTP alternation log region.

FIG. 1 is a diagram of an electronic device 10 that may need to keep track of information that could be altered. Electronic device 10 may include a controller 12, a non-volatile storage 14, and a volatile storage 16. Electronic device 10 may comprise a single integrated circuit or multiple integrated circuits. Controller 12 may be a processor of an electronic control unit of an automobile, or a processor for a media device, or any other type of processor. Non-volatile storage 14 may be flash memory or any other suitable non-volatile memory. Volatile storage may be a SRAM, DRAM, a collection of flip-flops, or any other type of volatile memory. Controller 12, non-volatile storage 14, and volatile storage 16 may be interconnected via a bus 18. Controller 12 may include both non-volatile storage 14 and volatile storage 16.

Figure 2:
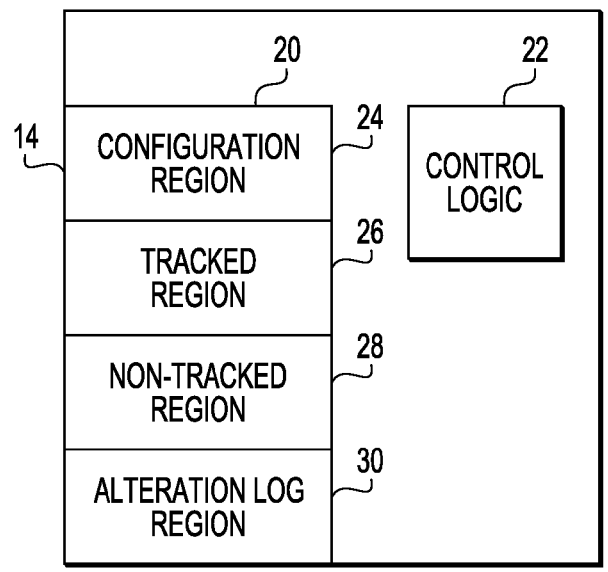
FIG. 2 is a diagram of an exemplary embodiment of the non-volatile storage of FIG. 1.

FIG. 2 is a diagram of an exemplary embodiment of the non-volatile storage of FIG. 1. Non-volatile storage 14 may include different types of regions 20 for storing information and control logic 22. The various regions 20 for storing information may include a configuration region 24, tracked region 26, non-tracked region 28, and alteration log region 30. By way of example, configuration region 24 may include information that may be used to configure the non-volatile storage and its use in a specific application. In one embodiment, configuration region 24 may include a one-time programmable configuration register. Tracked region 26 may include blocks that need to be tracked in terms of alteration to those blocks. Non-tracked region 28 may include blocks that do not need to be tracked in terms of alteration to those blocks. Alteration log region 30 may include bits that are used to keep track of alterations to tracked region 26, for example. In one embodiment, alteration log region 30 may be a non-erasable one-time programmable (NEOTP) region. Although FIG. 2 shows specific regions, the regions may be different from those shown and some of their functionality may be combined and/or distributed.

Figure 3:
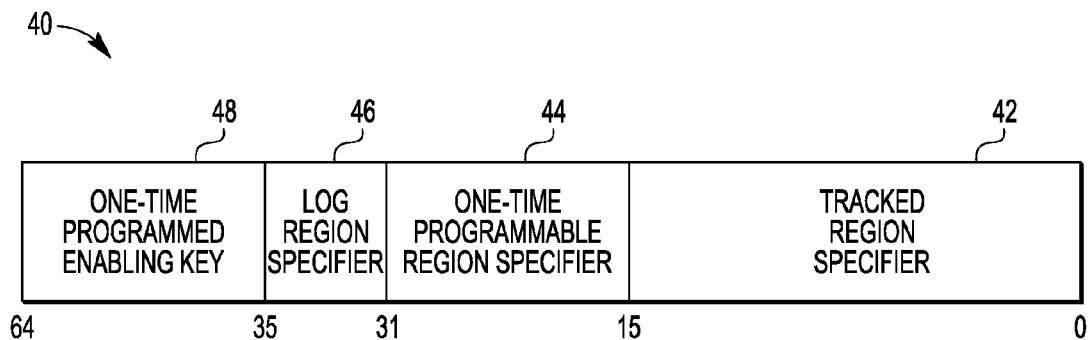
FIG. 3 is a diagram of an exemplary embodiment of the one-time programmable configuration register.

FIG. 3 is a diagram of an exemplary embodiment of the one-time programmable configuration region 24. In one embodiment, configuration region 24 may be implemented as a configuration register 40. Configuration register 40 may include a tracked region specifier 42, a one-time programmable region specifier 44, a log region specifier 46, and a one-time programmed enabling key 48. Tracked region specifier 42 may include information concerning those blocks that have information whose alteration needs to be tracked for a particular application. By way of example, such information may be bits corresponding to blocks that have information that needs to be tracked. Thus, for example, tracked region specifier 42 may have some form of addressing information for tracked region 26 of non-volatile storage 14. Tracked region specifier 42 may include code that when decoded may provide bits corresponding to blocks that have information that needs to be tracked. For example, in an automobile related application, tracked region specifier 42 may provide bits corresponding to blocks that have configuration parameters for an engine control unit. By doing so, an automobile manufacturer or a related entity may be able to determine whether there were any unauthorized changes to the configuration parameters. If so, then the automobile manufacturer may void the warranty or refuse to service the automobile and thereby avoid unnecessary expenditure. By way of another example, in a consumer application, tracked region specifier 42 may provide bits corresponding to blocks that have security and access control information.

With continued reference to FIG. 3, one-time programmable region specifier 44 may include information concerning those blocks that cannot be programmed more than once. Thus, for example, one-time programmable region specifier 42 may have some form of addressing information for one-time programmable regions of non-volatile storage 14. One-time programmable region specifier 44 may include code that when decoded may provide bits corresponding to blocks that have information that cannot be programmed more than once. For example, in an automobile related application, one-time programmable region specifier may provide bits corresponding to blocks that have information for parameters that should never be changed. By way of example, such a parameter may be the vehicle identification number. By way of another example, in a consumer application, one-time programmable region specifier 44 may provide bits corresponding to blocks that relate to information that the distributor of the consumer application device may not want to be changed ever again. Log region specifier 46 may include information concerning those blocks that have the alteration log. Thus, for example, log region specifier 46 may have some form of addressing information for alteration log region 30 of non-volatile storage 14. Log region specifier 44 may include code that when decoded may provide bits corresponding to blocks that have the alteration log information. One-time programmed enabling key 48 may be used to determine whether the use of the information stored in configuration register 40 is enabled. Although FIG. 3 shows a specific number of fields arranged in a specific manner as part of configuration register 40, there may be fewer or more fields that may be arranged differently. In addition, configuration information could be provided without the use configuration register 40.

Figure 4:
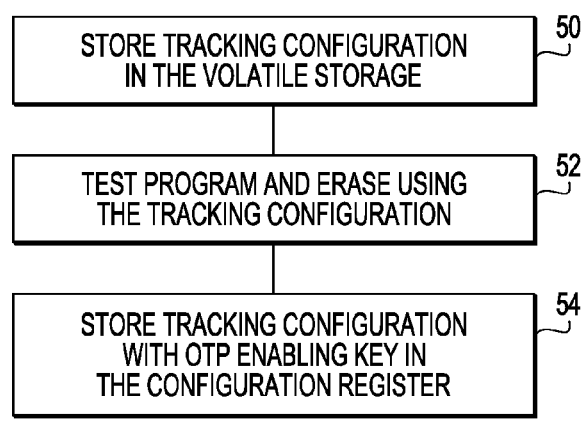
FIG. 4 is a diagram of an exemplary flowchart of a method for testing the tracking configuration and for storing the final configuration in the one-time programmable configuration register.

FIG. 4 is a diagram of an exemplary flowchart for storing configuration register 40. In step 50, a user may store tracking configuration information in volatile storage 16. As part of this step, depending on the type of application of electronic device 10, the user may store appropriate tracking configuration information. Next, in step 52, the user may test program and erase using the tracking configuration information. By way of example, as part of this step, the user may evaluate and test the alteration tracking strategy prior to irreconcilably programming configuration information in a one-time programmable memory region. Next, in step 54, the tracking configuration information along with one-time programmed enabling key 48 may be stored in configuration register 40. Although FIG. 4 shows a specific number of steps that are performed in a certain order, there may be fewer or more steps that may be performed in a different order.

Figure 5:
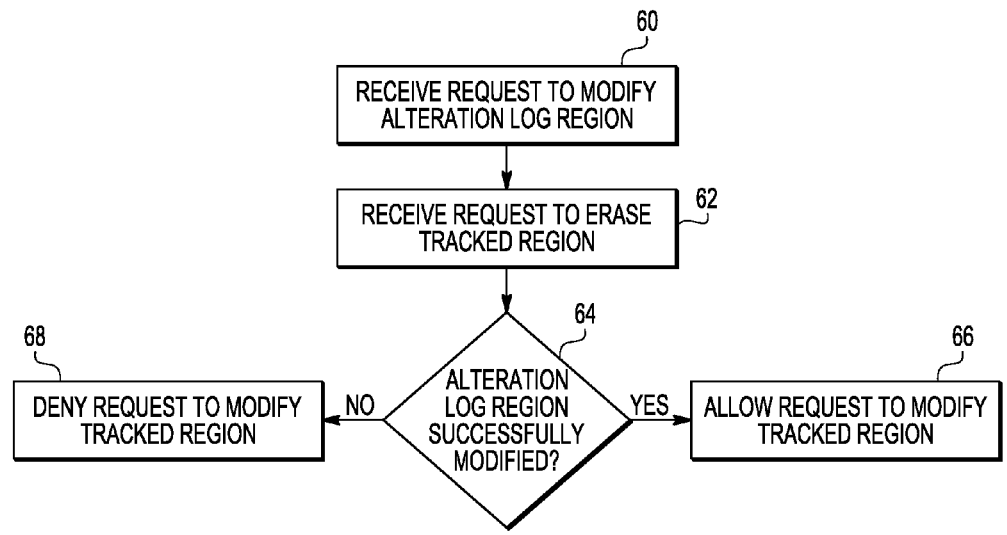
FIG. 5 is a diagram of an exemplary flowchart or a method for alteration tracking.

FIG. 5 is a diagram of an exemplary flowchart for alteration tracking. As shown, by way of example, in step 60, control logic 22 may receive a request to modify alteration log region 30 of non-volatile storage 14. In step 62, control logic 22 may receive a request to modify tracked region 26. By way of example, when non-volatile storage 14 is a flash memory, the request to modify would be the same as a request to erase. If non-volatile storage 14, however, is some other form of non-volatile storage, then the request to modify may be the appropriate request for that type of storage. In response to the request to modify tracked region 26, in step 64, control logic 22 may determine whether or not a modification of the data stored in a non-erasable one-time programmable (NEOTP) alteration log region 30 has occurred. If control logic 22 determines that the modification of the data stored in the NEOTP alteration log region 30 has occurred, it may, in step 66 modify tracked region 26 of non-volatile storage 14. If on the other hand, control logic 22 determines that the modification of the data stored in the NEOTP alteration log region 30 has not occurred, it may, in step 68, deny the request to modify tracked region 26 of non-volatile memory 14. Although FIG. 5 shows a specific number of steps that are performed in a certain order, there may be fewer or more steps that may be performed in a different order.

Figure 6:
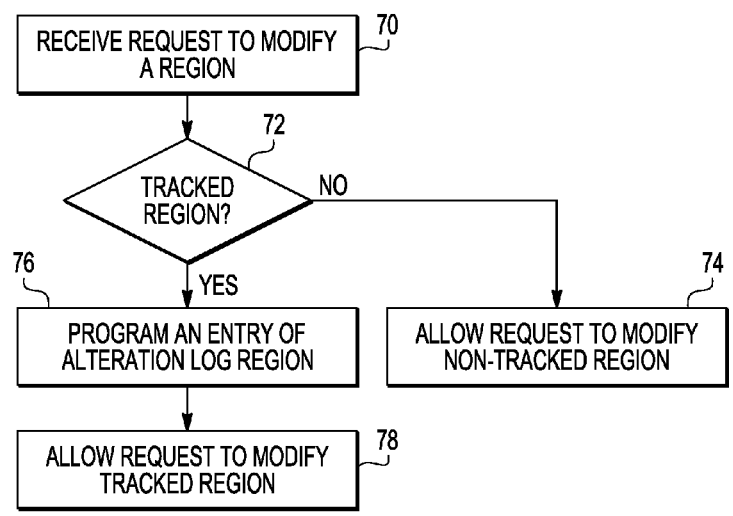
FIG. 6 is a diagram of another exemplary flowchart of a method for alteration tracking.

FIG. 6 is a diagram of another exemplary flowchart for alteration tracking. As shown, by way of example, in step 70, control logic 22 may receive a request to modify a region. In step 72, control logic 72 may determine whether the region is a tracked region. If it is not, then control logic 22, in step 74, may allow the request to modify the non-tracked region. On the other hand, if the region is a tracked region, then in step 76, control logic 22 may program an entry of alteration log region 30. In addition, in step 78, control logic 22 may allow the request to modify tracked region 26. Although FIG. 6 shows a specific number of steps that are performed in a certain order, there may be fewer or more steps that may be performed in a different order.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It is to be understood that the circuits depicted herein are merely exemplary. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, while the specification describes that several method steps are performed by control logic 22, these steps may be performed by other logic. Similarly, control logic 22 need not perform these steps by itself; instead it could cooperate with other components to perform the various method steps. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for tracking alteration of a non-volatile storage, the method comprising:
receiving a request to modify a tracked region of the non-volatile storage;
in response to the request, determining whether or not a modification of data stored in a non-erasable one-time programmable (NEOTP) alteration log region has occurred;
in response to determining that the modification of the data stored in the NEOTP alteration log region has occurred, modifying the tracked region of the non-volatile storage in response to the request;
in response to determining that the modification of the data stored in the NEOTP alteration log region has not occurred, denying the request to modify the tracked region of the non-volatile memory; and
providing a configuration register which specifies a first portion of the non-volatile storage as the tracked region and a second portion of the non-volatile storage as the NEOTP alteration log region.

2. The method of claim 1, further comprising:
receiving a second request to modify the data stored in the NEOTP alteration log region of the non-volatile storage; and
in response to the second request, initiating the modification of the data stored in the alteration log region.

3. The method of claim 1, further comprising:
in response to the request, initiating the modification of the data stored in the NEOTP alternation log region.

4. The method of claim 1, further comprising:
providing a configuration register which specifies at least a portion of the non-volatile storage as the tracked region.

5. The method of claim 1, further comprising:
receiving a second request to modify a non-tracked region of the non-volatile storage; and
in response to the second request, modifying the non-tracked region of the non-volatile storage without modifying data stored in the NEOTP alternation log region.

6. The method of claim 1, further comprising:
receiving a second request to modify an entry of the non-volatile storage; and
in response to the second request, determining if the entry is included in a one-time programmable (OTP) region of the non-volatile storage; and
in response to determining that the entry is included in the OTP region, determining whether the entry includes at least one programmed value, and if so, denying the second request to modify the entry.

7. The method of claim 6, further comprising:
providing a configuration register which specifies a portion of the non-volatile storage as the OTP region.

8. A method for tracking alteration of a non-volatile storage, the method comprising:
receiving a first request to modify data stored in a non-erasable one-time programmable (NEOTP) alteration log region of the non-volatile storage;
in response to the first request, initiating the modification of the data stored in the NEOTP alteration log region;
receiving a second request to erase at least a portion of a tracked region of the non-volatile storage;
in response to the second request, determining whether or not the modification of the data stored in the NEOTP alteration log region has been completed;
in response to determining that the modification of the data stored in the NEOTP alteration log region has been completed, erasing the at least a portion of the tracked region of the non-volatile storage in response to the request;
in response to determining that the modification of the data stored in the NEOTP alteration log region has not been completed, denying the request to erase the at least a portion of the tracked region of the non-volatile memory; and
providing a configuration register which specifies a first portion of the non-volatile storage as the tracked region and a second portion of the non-volatile storage as the NEOTP alteration log region.

9. The method of claim 8, further comprising:
providing volatile storage coupled to the configuration storage circuitry, wherein the volatile storage allows for emulation of the configuration storage circuitry.

10. The method of claim 8, further comprising:
receiving a third request to modify a non-tracked region of the non-volatile storage; and in response to the third request, modifying the non-tracked region of the non-volatile storage without modifying data stored in the NEOTP alteration log region.

11. The method of claim 10, further comprising:
receiving a fourth request to modify an entry of the non-volatile storage; and
in response to the fourth request, determining if the entry is included in a OTP region of the non-volatile storage; and
in response to determining that the entry is included in the OTP region, determining whether the entry includes at least one programmed value, and if so, denying the fourth request to modify the entry.

12. The method of claim 11,
a wherein the configuration register specifies a third portion of the non-volatile storage as the OTP region.

13. The method of claim 8, further comprising:
receiving a third request to modify an entry of the non-volatile storage; and
in response to the third request, determining if the entry is included in a OTP region of the non-volatile storage; and
in response to determining that the entry is included in the OTP region, determining whether the entry includes at least one programmed value, and if so, denying the third request to modify the entry.

14. The method of claim 8, further comprising:
providing a one-time programmable (OTP) configuration register which specifies a one-time programmed enabling key; and
comparing the one-time programmed enabling key with a stored enabling key, wherein the receiving the first request, the initiating the modification, the receiving the second request, the determining, the erasing, and the denying are performed when the one-time programmed enabling key and the stored enabling key match.

15. A method for tracking alteration of a non-volatile storage, the method comprising:
receiving a request to modify a region of the non-volatile storage;
in response to the region being a tracked region of the non-volatile storage, programming an entry of a non-erasable one-time programmable (NEOTP) alteration log region and modifying the tracked region of the non-volatile storage in response to the request;
in response to the region being a non-tracked region of the non-volatile storage, modifying the non-tracked region of the non-volatile storage without modifying data stored in the NEOTP alternation log region; and
providing configuration storage circuitry which specifies a first portion of the non-volatile storage as the tracked region and a second portion of the non-volatile storage as the NEOTP alteration log region.

16. The method of claim 15, wherein the configuration storage circuitry is further characterized as one-time programmable (OTP) storage.

17. The method of claim 15, wherein the request to modify the data stored in the tracked region is further characterized as a request to erase at least a portion of the tracked region.

* * * * *